Mar. 13, 1923.　　　　　　　　　　　　　　　　　　　1,448,496.
J. F. O'CONNOR.
FRICTION SHOCK ABSORBING MECHANISM.
FILED APR. 25, 1921.
2 SHEETS—SHEET 1.
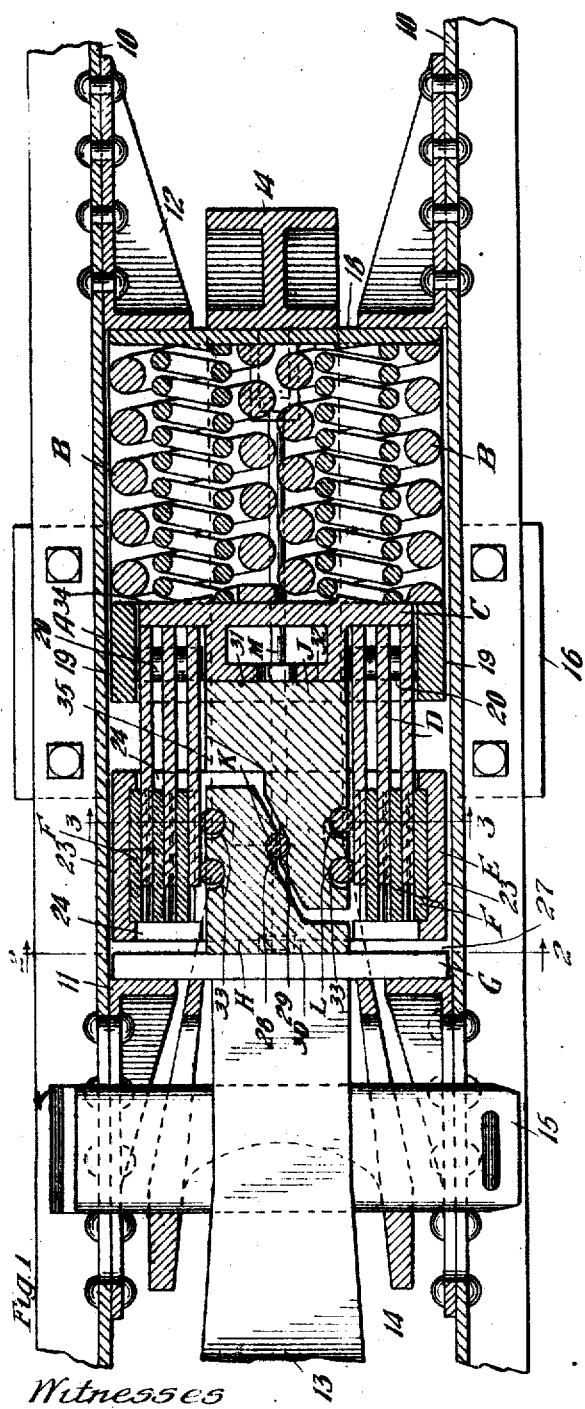
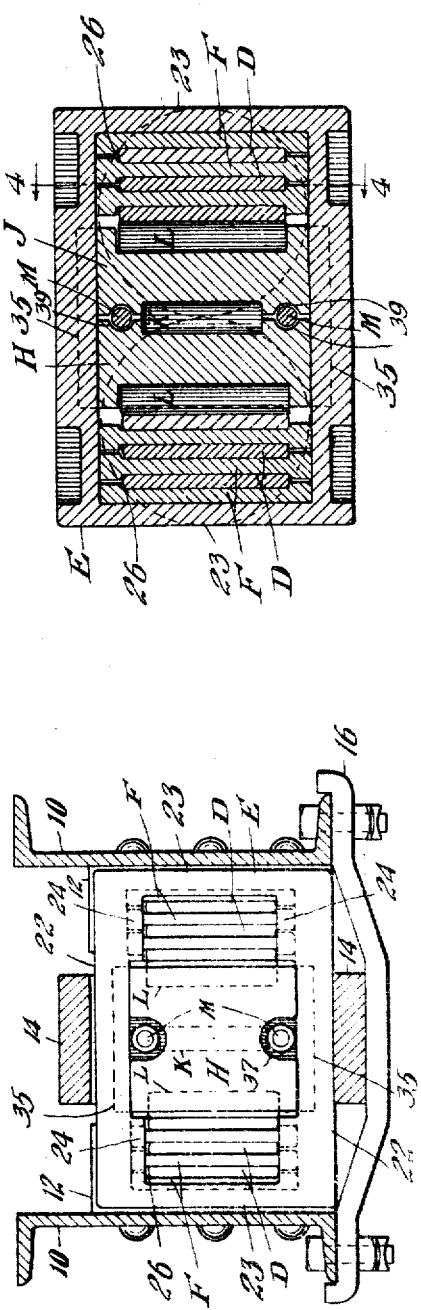
Inventor
John F. O'Connor
By Geo. I. Haight
His Atty.
Witnesses
Wm. Geiger Mar. 13, 1923.
J. F. O'CONNOR.
FRICTION SHOCK ABSORBING MECHANISM
FILED APR. 25, 1921.
1,448,496.
2 SHEETS—SHEET 2.
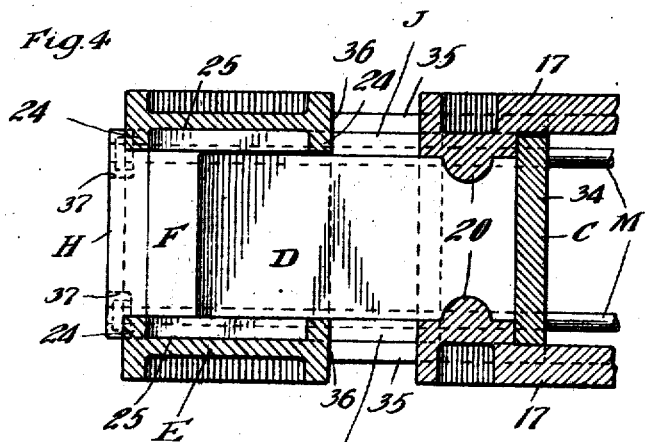
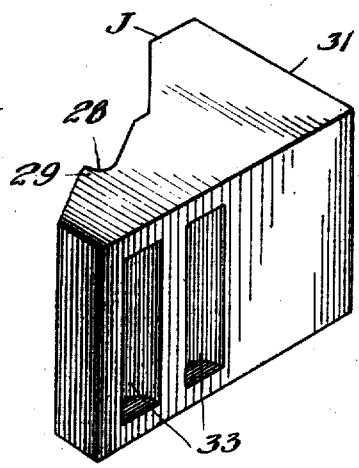
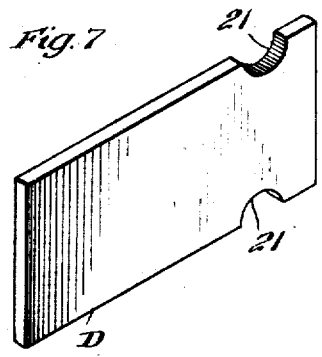
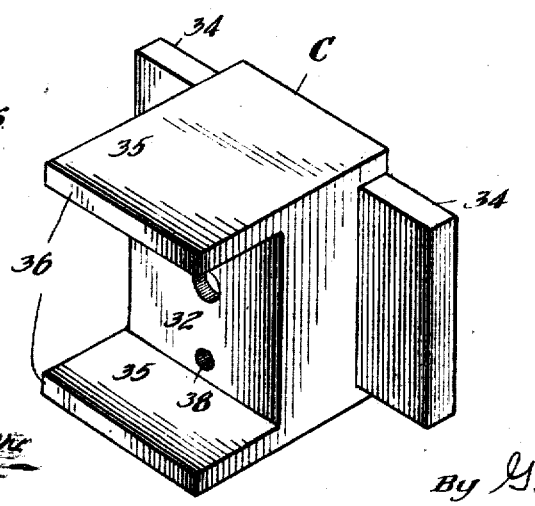
Witnesses
Inventor
John F. O'Connor
By Geo. I. Haight
His Atty.

Patented Mar. 13, 1923.

1,448,496

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed April 25, 1921. Serial No. 464,234.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity shock absorbing mechanism especially adapted for railway draft riggings and wherein are obtained certain release, a graduated smooth action, long life, uniform action at all times, low stresses on all friction elements, and low ultimate or peak low transmitted to the car underframe or other supporting framework.

A more specific object of the invention is to provide a friction shock absorbing mechanism of the general character above indicated wherein is employed a wedging or pressure-creating system that is composed of a plurality of separate parts which are relatively movable and are provided with anti-friction means therebetween in conjunction with anti-friction means interposed between said system considered as an entirety and the friction elements to thereby positively insure an extremely sensitive and instantaneous functioning of said wedging system both during the act of compression and during release.

Another specific object of the invention is to provide a mechanism of the character indicated wherein are employed two members relatively movable toward and from each other, each of said members having a series of friction elements, preferably in the form of plates, secured thereto and relatively longitudinally immovable with respect to the member to which the friction elements are secured, the friction elements being intercalated for the purpose of obtaining large frictional wearing areas.

Other objects of the invention will more clearly appear from the description hereinafter following.

In the drawings forming a part of this specification, Figure 1 is a horizontal, longitudinal, sectional view of a portion of a railway draft rigging showing my improvements in connection therewith. Figure 2 is a vertical, sectional view corresponding substantially to the line 2—2 of Figure 1. Figure 3 is an enlarged vertical sectional view corresponding substantially to the line 3—3 of Figure 1 but omitting any showing of the draft sills or yoke of the draft rigging. Figure 4 is a broken, longitudinal, vertical, sectional view corresponding substantially to the line 4—4 of Figure 3. And Figures 5, 6 and 7 are detail perspectives of one of the wedge elements, a spring follower, and one of the friction plates, respectively.

In said drawings, 10—10 denote channel draft sills of a railway car to the inner faces of which are secured front stop lugs 11 and rear stop lugs 12, the same being of any desired form. The inner portion of a draw-bar is indicated at 13, the same being operatively associated with the shock absorbing mechanism proper by means of a hooded cast yoke 14 and coupler key 15. The yoke and parts within are supported in operative position by a detachable saddle plate 16.

The improved shock absorbing mechanism proper, as shown, comprises, broadly, a column-load-sustaining member A; a spring resistance B; a spring follower C; a series of friction plates D; a casing or carrier E; a series of friction plates F mounted in said casing E; a front follower G; a wedging system comprising the elements H and J; an anti-friction roller K interposed between said elements H and J; sets of side anti-friction rollers L; and retainer bolts M—M.

The column-load-sustaining member A, as shown, is in the form of a casting of hollow box-like form having upper and lower parallel walls 17—17, an integral vertical connecting wall 18 adapted to act as a follower in conjunction with the stop lugs 12, and vertical side walls 19—19 at the outer or forward end of said casting A, said side walls 19 being relatively short as clearly indicated in Figure 1, so as to leave the major portion of the sides of the member A open to thereby facilitate the insertion and removal of the follower C and twin springs comprising the spring resistance B. From the preceding description, it will be seen that a rectangular casing is formed at the forward end of the member A and the greater portion of the rear of said rectangular casing constitutes the cage for the spring resistance.

Within the rectangular casing referred to in the preceding, the upper and lower walls are formed, on each side of the center, with transversely extending complemental rounded ribs 20—20. Each of the friction plates D, which are of generally rectangular flat form preferably stamped, is notched on its opposite edges as indicated at 21—21 in Figure 7 to correspond with the size and contour of the ribs 20. With this arrangement the plates D may be inserted within the member A centrally thereof and, when the notches 21 are opposite the ribs 20, the plates D may be slipped laterally or sidewise on to said ribs 20 and the plates D thereby prevented from movement longitudinally relatively to the member A although free to move laterally and thus sensitive to laterally applied pressure on the plates D. In the preferable arrangement shown, six plates D are employed divided equally, three on each side of the center line of the mechanism.

The casing E is of hollow rectangular form having upper and lower parallel walls 22—22, and vertical side connecting walls 23—23. On each side of the center, said top and bottom walls 22 are provided on both their front and rear edges with inturned complemental flanges 24—24, thus providing upper and lower transversely extending elongated grooves or guideways 25 on opposite sides of the center line on the inner faces of said walls 22. Within said grooves or guideways 25 are laterally inserted the friction elements F which are in the form of plates, as shown in Figures 1 and 2, it being understood that said plates F are prevented from movement longitudinally relatively to the casing E but are free to move laterally therein and thus also sensitive to transversely applied pressure. As best shown in Figure 3, the plates F are alternated with the plates D and normally partially overlap the plates D. Preferably there will be six of the stationary plates F, three on each side of the center line, the two plates F of each group nearest the center line being of I-cross section and the outermost one of each group of half I-cross section. With this arrangement, guides 26 are provided by and between adjacent parts of plates F for each of the plates D and at the same time sufficient clearance is left between the thickened edges of the plates F to allow the latter to be freely responsive to laterally applied pressure. Preferably also I so arrange the plates F and D as to have a plate D the innermost one of each group. As shown in Figures 1 and 4, the opposed edges of the casing E and member A are separated a distance slightly less than the permissible compression stroke of the mechanism, the balance of said stroke corresponding to the space 27 which normally obtains between the follower G and the front edges of the casing E.

The follower G preferably consists of a flat plate such as common in the art and is adapted to cooperate with the stop lugs 11 under draft and also to transmit pressure directly from the butt of the drawbar 13 to the wedge element H which projects slightly outwardly from the casing E when the parts are in normal condition.

The wedge system, as shown, consists of the two elements H and J which are of generally similar form although varying slightly in details. Each of said members H and J has an inclined wedge face 28, the same being arranged opposite each other and providing seats for the anti-friction roller K, which is interposed between said wedge faces 28. The members H and J are provided also with oppositely disposed shoulders 29 cooperable with said roller K to properly maintain it in position as will be understood. The member H has an outer transverse face 30 directly bearing upon the follower G and the member J has a corresponding transverse face 31 at its inner end which bears against the transverse face 32 of the central hollow section of the follower C which is extended between the two groups of the plates D. On its outer side, each member H and J is provided with two roll seats 33—33 to accommodate said rollers L—L, the latter projecting slightly outwardly beyond the longitudinal outer faces of the members H and J and rolling upon the inner plates D—D. Said roll seats 33 are sufficiently elongated, in a direction parallel to the axis of the mechanism, to permit said rollers L—L to roll freely therewithin within the necessary limits desired.

The follower C, as best shown in Figures 1 and 6, is provided with lateral extensions 34—34 to form suitable bearings for the forward ends of the twin springs, said extensions 34 normally bearing against the inner ends of the plates D. In addition, the follower C is provided with upper and lower forwardly extending parallel horizontal flanges 35—35 which straddle the wedge element J and have their forward edges 36—36 normally engaging the rear edges of the casing E.

The retainer bolts M, preferably two in number, are arranged so as to have the heads at one end thereof engage in suitable pockets formed on the member A and the nuts on the other end thereof countersunk in suitable recesses 37—37 in the wedge member H, the follower C being suitably perforated as indicated at 38 and the wedge elements H and J suitably grooved as indicated at 39 to accommodate said bolts. Said bolts not only maintain all of the parts in assembled relation but may also be utilized to place the spring resistance under an initial compression to compensate for wear on the parts when the mechanism is in service.

The operation of the mechanism is as follows, assuming an inward or buffing movement of the drawbar. As the drawbar moves inwardly, the follower G is forced inwardly simultaneously and uniformly therewith, during which action the member A acts as a follower and column to resist the longitudinal shocks. The member A being held stationary, the plates D are likewise held stationary. During the initial portion of the compression stroke, the wedge elements H and J will be forced rearwardly or inwardly with respect to all of the friction plates D and F and the wedging or spreading action thus set up will cause lateral increased pressure on the groups of alternated plates. This action forces the follower C rearwardly so as to pass out of contact with the rear edges of the plates D. After approximately a half inch of the stroke, the follower G will engage the casing E at which time the desired lateral pressure on the plates will have been produced. Thereafter, the casing E carrying the plates F will travel inwardly or rearwardly in unison with the follower G and drawbar 13, thus causing the plates F to slide upon the plates D and generating friction and absorbing the shock supplemental to the resistance afforded by the springs. The limit of the compression stroke is obtained when the casing E engages the column-load-sustaining member A. Upon removal of the actuating force, the initiation of the release action is obtained by the springs reacting through the follower C which forces the wedging system, as a unit, to move outwardly and to collapse until the forward edges 36 of the flanges 35 of the follower C re-engage the casing or carrier E at which time the pressure on the friction plates will have been reduced to the desired minimum and further expansion of the springs will force the casing or carrier E outwardly until the parts return to their normal condition shown in Figure 1. On account of the fact that the wedging system is anti-frictionally mounted with respect to the friction elements and because of the anti-friction means employed between the elements of the system, said wedging system is extremely sensitive and insures a rapid and substantially instantaneous setting up of the desired wedging pressure during the compression stroke and a correspondingly rapid decrease or collapse of said spreading pressure at the beginning of the release stroke.

It will be noted that the wedging pressure set up on the alternated groups of plates never can exceed a certain maximum which is determined by the capacity of the springs, that is, the maximum wedging or spreading pressure exerted on the plates is not proportional to the blow imposed by the drawbar. On this account, the stresses induced in any of the parts never become excessive and danger from bursting or rupture is thereby prevented. Furthermore, by employing the alternated friction plates, I am enabled to obtain a very large amount of frictional wearing areas to thereby increase the frictional capacity to a value several times that now obtained in many types of friction gears on the market. The wear entirely occurs on the plates D and F and these can be readily manufactured at comparatively small expense and renewals effected with a slight amount of labor. The arrangement is such that the work performed by the mechanism is always proportional to the blow applied, uniform increments of blow producing uniform increments of movement of the mechanism and uniform increments of work performed. The mechanism is smooth and graduated in its action, and is not "stiff." Another valuable feature that will be appreciated by those skilled in the art is that the friction elements are not brought into action by slight shocks which, as well known in the art, are many times more numerous than medium or heavy shocks. In other words, the almost constant minor vibrations or surgings of the drawbar relatively to the gear, when the car is in movement, will be absorbed by the springs and actuation of the wedging system without inducing relative movement of the alternated friction plates. This result is of extreme importance in prolonging the life of the mechanism since it minimizes the wear of the friction parts.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a column-load-sustaining member; of a series of friction elements carried by and extending outwardly form said member and held against movement longitudinally relatively thereto; a carrier, said carrier being movable relatively toward and from said member; a second series of friction elements mounted on and movable in unison with said carrier and intercalated with respect to the first named series, said second series of friction elements being disposed entirely outside of the said member; a spring resistance; and lateral-pressure-creating means cooperable with said intercalated friction elements.

2. In a friction shock absorbing mechanism, the combination with a column-loadsustaining member; of a series of friction elements carried by and extended outwardly from said member and held against longitudinal movement relatively thereto; a carrier movable relatively toward and from said member; a second series of friction elements mounted on and movable in unison with said carrier and intercalated with respect to the friction elements of the first named series, said intercalated friction elements being divided into two groups, one on each side of the center line of the mechanism, the friction elements of said second series being disposed entirely outside of the said member; a spring resistance; and lateral-pressure-creating means interposed between said two groups of intercalated elements and cooperable therewith.

3. In a friction shock absorbing mechanism, the combination with a column-load-sustaining member, said member including a casing at one end, a follower at the other end and a spring cage therebetween; of a series of friction elements secured to said member within said casing portion thereof and held against longitudinal movement with respect thereto; a carrier movable toward and from said member; a second series of friction elements mounted on and movable in unison with said carrier and frictionally slidable upon the friction elements of the first named series, the elements of said second series being disposed outside said member; a spring resistance within said cage; and lateral-pressure-creating means cooperable within said friction elements.

4. In a friction shock absorbing mechanism, the combination with a column-load-sustaining member, said member including a casing at one end, a follower at the other end and a spring cage therebetween; of a series of friction elements secured to said member within the casing portion thereof and extended outwardly from said member; a carrier movable toward and from said member; a second series of friction elements mounted on and movable in unison with said carrier and intercalated with respect to the elements of the first named series, the elements of the series being disposed entirely outside of the said member and the intercalated elements being divided into two groups, one on each side of the center line; a spring resistance within said cage; and lateral-pressure-creating means interposed between said two groups of friction elements.

5. In a friction shock absorbing mechanism, the combination with a column-load-sustaining member; of a series of friction elements carried by and extending outwardly from said member and held against movement longitudinally relatively thereto; a carrier, said carrier being movable relatively toward and from said member; a second series of friction elements mounted on and movable in unison with said carrier and intercalated with respect to the first named series, said second series of friction elements being disposed entirely outside of the said member; a spring resistance; lateral-pressure-creating means cooperable with said intercalated friction elements; and a follower on the side of said carrier remote from said member, said follower being normally spaced from the carrier and said pressure-creating means being interposed between said follower and the spring resistance.

6. In a friction shock absorbing mechanism, the combination with a column-load-sustaining member; of a series of friction elements carried by and extended outwardly from said member and held against longitudinal movement relatively thereto; a carrier movable relatively toward and from said member; a second series of friction elements mounted on and movable in unison with said carrier and intercalated with respect to the friction elements of the first named series, said intercalated friction elements being divided into two groups, one on each side of the center line of the mechanism, the friction elements of said second series being disposed entirely outside of the said member; a spring resistance; lateral-pressure-creating means interposed between said two groups of intercalated elements and cooperable therewith; and a follower on that side of the carrier remote from said member, said follower being normally spaced from the carrier and said pressure-creating means extending also between said follower and the spring resistance.

7. In a friction shock absorbing mechanism, the combination with a column-load-sustaining member; of a series of friction elements carried by and extending outwardly from said member and held against movement longitudinally relatively thereto; a carrier, said carrier being movable relatively toward and from said member; a second series of friction elements mounted on and movable in unison with said carrier and intercalated with respect to the first named series, said second series of friction elements being disposed entirely outside of the said member; a spring resistance; lateral-pressure-creating means cooperable with said intercalated friction elements; a follower on the side of said carrier remote from said member, said follower being normally spaced from the carrier and said pressure-creating means being interposed between said follower and the spring resistance; and anti-friction means interposed between said pressure-creating means and the friction elements.

8. In a friction shock absorbing mechanism, the combination with a column-loadsustaining member; of a series of friction elements carried by and extended outwardly from said member and held against longitudinal movement relatively thereto; a carrier movable relatively toward and from said member; a second series of friction elements mounted on and movable in unison with said carrier and intercalated with respect to the friction elements of the first named series, said intercalated friction elements being divided into two groups, one on each side of the center line of the mechanism, the friction elements of said second series being disposed entirely outside of the said member; a spring resistance; lateral-pressure-creating means interposed between said two groups of intercalated elements and cooperable therewith; a follower on that side of the carrier remote from said member, said follower being normally spaced from the carrier and said pressure-creating means extending also between said follower and the spring resistance; and anti-friction means interposed between said pressure-creating means and each group of friction elements.

9. In a friction shock absorbing mechanism, the combination with a column-load-sustaining member; of a series of friction elements carried by and extending outwardly from said member and held against movement longitudinally relatively thereto; a carrier, said carrier being movable relatively toward and from said member; a second series of friction elements mounted on and movable in unison with said carrier and intercalated with respect to the first named series, said second series of friction elements being disposed entirely outside of the said member; a spring resistance; lateral-pressure-creating means cooperable with said intercalated friction elements, said pressure-creating means including a plurality of elements; anti-friction means disposed between said elements; and a follower on the side of said carrier remote from said member, said follower being normally spaced from the carrier and the pressure-creating means being interposed between said follower and the spring resistance.

10. In a friction shock absorbing mechanism, the combination with a column-load-sustaining member; of a series of friction elements carried by and extended outwardly from said member and held against longitudinal movement relatively thereto; a carrier movable relatively toward and from said member; a second series of friction elements mounted on and movable in unison with said carrier and intercalated with respect to the friction elements of the first named series, said intercalated friction elements being divided into two groups, one on each side of the center line of the mechanism, the friction elements of said second series being disposed entirely outside of the said member; a spring resistance; lateral-pressure-creating means interposed between said two groups of intercalated elements and cooperable therewith, said pressure-creating means including a plurality of elements relatively movable; anti-friction means interposed between said elements; and a follower on the side of said carrier remote from said member, said follower being normally spaced from the carrier and the pressure-creating means being interposed between said follower and the spring resistance.

11. In a friction shock absorbing mechanism of the character described, the combination with a hollow follower-acting member open at one end; of a series of friction plates secured at their inner ends to the open end of said member and extending outwardly therefrom; a carrier normally spaced from and movable relatively toward and from said member; a second series of friction plates carried by and movable in unison with said carrier and intercalated with the plates of the first series, said intercalated plates being divided into two groups, one on each side of the center line; a spring resistance within said member; a follower interposed between said spring resistance and the anchored ends of said plates of the first series, said follower having extensions normally engaging said carrier; a wedge-pressure-creating system mounted between said groups of friction elements, the inner end of said system engaging said spring follower and the outer end of said system extending beyond said carrier and adapted to initially receive the force under a compression stroke; and anti-friction means interposed between said system and each group of friction plates.

In witness that I claim the foregoing I have hereunto subscribed my name this 15th day of Apr. 1921.

JOHN F. O'CONNOR.

Witnesses:
 CARRIE GAILING,
 ANN BAKER.